Figure 1:
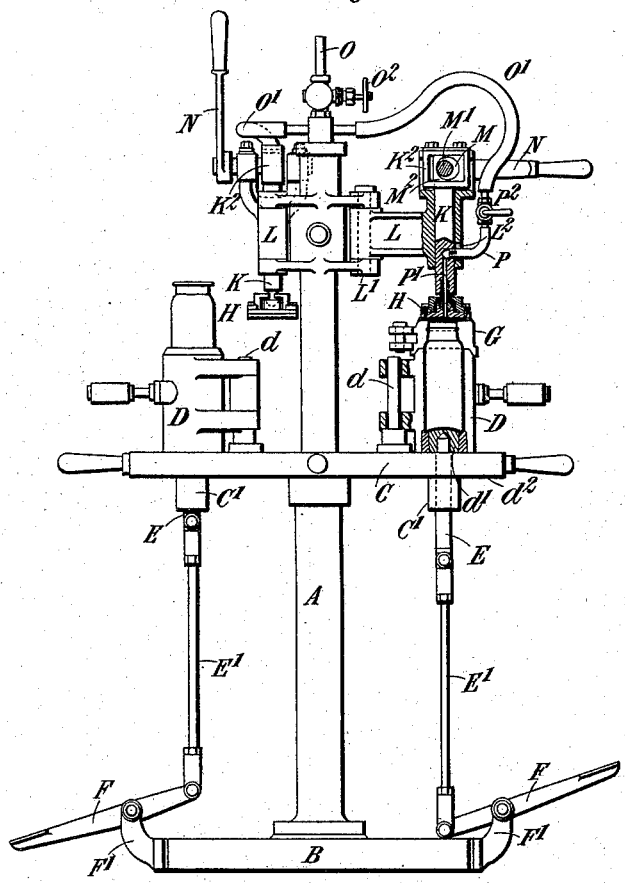

(No Model.) 2 Sheets—Sheet 1.
C. EMMET.
MACHINE FOR MANUFACTURING GLASS BOTTLES, &c.

No. 567,739. Patented Sept. 15, 1896.

Witnesses:
Arthur Ashley
M. A. M. Trayser

Inventor:
Charles Emmet
By E. S. Clark
Atty.

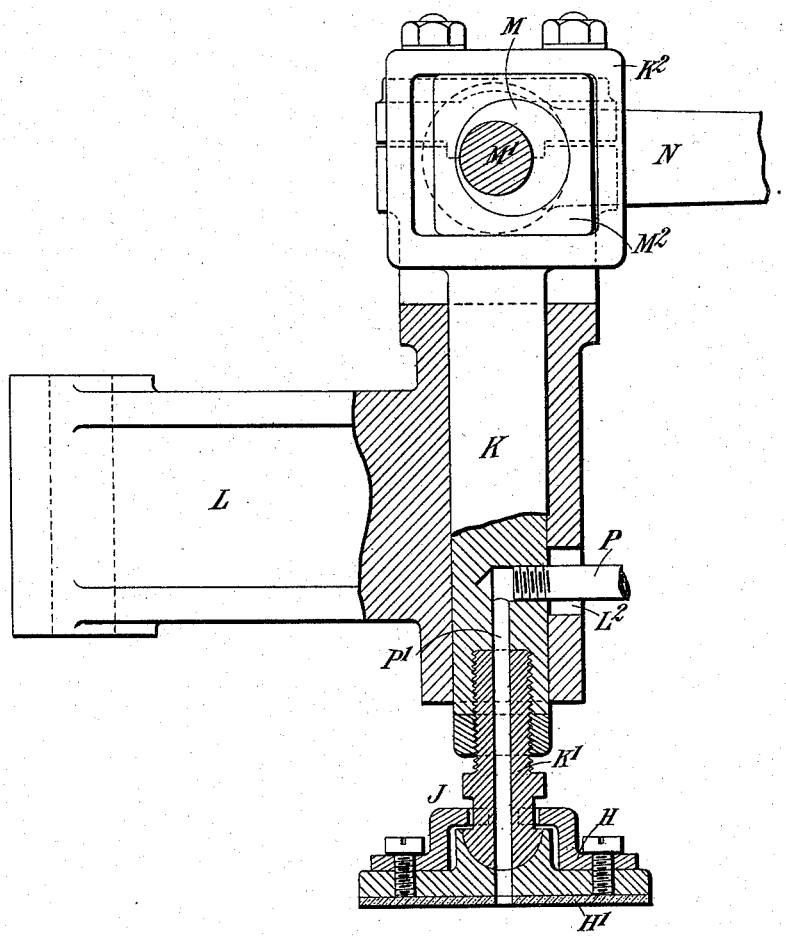

UNITED STATES PATENT OFFICE.

CHARLES EMMET, OF SHEFFIELD, ENGLAND.

MACHINE FOR MANUFACTURING GLASS BOTTLES, &c.

SPECIFICATION forming part of Letters Patent No. 567,739, dated September 15, 1896.

Application filed September 16, 1895. Serial No. 562,624. (No model.) Patented in England September 2, 1893, No. 16,524.

*To all whom it may concern:*

Be it known that I, CHARLES EMMET, mechanical engineer, a subject of the Queen of Great Britain, residing at Sheffield, England, have invented an Improved Machine for the Manufacture of Glass Bottles, Jars, and the Like, (for which I have obtained a patent in Great Britain, No. 16,524, dated September 2, 1893,) of which the following is a specification, reference being had to the accompanying drawings.

My invention relates to a novel construction of machine for blowing into the finished form the Parason jars or bottles formed by the Parason pressing-machine.

Referring to the accompanying drawings, Figure 1 is a side elevation, partly in section, of a machine constructed according to my invention. Fig. 2 is a view, partly in section, of a portion of the machine drawn to a larger scale.

A is a central pillar supported by a base-plate B. C is a fixed table carried by the said pillar.

D D are the body portions of the molds, within which the bottles are blown. The said molds may be formed in one piece or they may be formed in halves hinged on the pin $d$. The bottom of the mold is formed by two separated pieces $d'$ $d^2$. The central piece $d'$ can be raised, as hereinafter described, for the purpose of pushing the finished bottle out of the mold. The annular piece $d^2$ is secured to the table. For raising the central piece $d'$ I provide a ram or rod E, which projects into a hole in the said piece $d'$. The said ram or rod is capable of sliding vertically in a tubular guide C', fixed to the table, and is connected by a link E' to a foot lever or treadle F, pivoted to a bracket F', secured to the base-plate B. By depressing the treadle the ram or rod E can be raised and the central piece $d'$ of the base of the mold thereby forced upward.

G is a shoulder-mold formed in halves, hinged together and shaped to fit on the upper edge of the body-mold D. The said shoulder-mold is the same as that used in the Parason pressing-machine, and is brought from the said Parason machine, together with the Parason bottle or jar therein, and placed on the body-mold D, and after the bottle is finished by the blowing process the said shoulder-mold is removed and taken back to the Parason pressing-machine in order to assist in forming another Parason jar, which is blown in its turn to the finished shape.

H is the cover for closing the mold during the blowing operation. It is faced with a ring of asbestos, rubber, or other suitable material H' to make a good joint with the upper edge of the shoulder-mold, so as to prevent leakage of air thereat when blowing the bottle. The said cover is connected by a ball-and-socket joint to a stud K', screwed into a rod K, which is movable vertically in a guide constituted by an arm L, pivoted at L' to the head of the pillar A. For moving the rod K up and down in its guide, I provide an eccentric M, secured on a shaft M', which is supported in bearings formed in the guide-arm L.

$M^2$ is a block embracing the eccentric and working in a rectangular strap $K^2$, formed by the head of the rod K.

N is a handle for turning the eccentric-shaft to raise and lower the cover H when required.

O is the pipe through which the compressed air for blowing the bottle is supplied to the machine.

O' is a flexible pipe which connects the pipe O with a short pipe P, passing through a vertical slot $L^2$ in the tubular part of the arm L and connected to the rod K. The said pipe P communicates with a central thoroughfare P', passing through the rod K, stud K', and cover H.

The machine is duplicated, that is to say, two sets of molds and two blowing apparatuses are provided. The right half of the drawings, Fig. 1, shows the parts in the positions they occupy when blowing a bottle. The left half of the drawings shows the blowing apparatus turned away from the molds, the shoulder-mold removed, and the finished bottle partially ejected from the body-mold.

$O^2$ is a valve or cock in the pipe O for shutting off the supply of air to the machine.

$P^2$ is a valve or cock in the pipe P for shutting off the air from its own blowing apparatus.

The operation of blowing the Parason bottle into the finished form is as follows, that is to say: The shoulder-mold with the Parason bottle therein having been placed on the body-mold, the handle N is turned to bring down the cover H on the top of the shoulder-mold in order to effectually close the top of said molds. The cock P² is then opened and compressed air thereby admitted to the interior of the Parason jar. This has the effect of expanding the jar and of causing it to assume the formation of the interior of the blowing-mold. When the blowing is complete, the cock P² is closed again and the handle N is raised and the arm L swung clear of the molds. The shoulder-mold is then opened and removed and the bottle is forced out of the slightly-taper body-mold by depressing the treadle or foot-lever F for a sufficient distance, as shown at the left side of Fig. 1, to render the final extraction of the bottle by a taking-out fork a simple and easy matter without distorting it.

What I claim is—

In a bottle and jar blowing machine, the combination of a table, a body-mold supported thereon and having a movable bottom, a rod and treadle or foot-lever for raising said bottom when required, a shoulder-mold, a cover for said shoulder-mold, a pivoted arm for carrying said cover, a rod controlled by an eccentric and handle for forcibly retaining the cover on the shoulder-mold during the blowing operation, a ball-and-socket connection between said cover and rod, a central thoroughfare in said rod and ball-and-socket connection, and a flexible pipe for conveying compressed air to said thoroughfare for blowing the bottle or jar, substantially as described.

In testimony whereof I have hereunto set my hand this 29th day of August, 1895.

CHARLES EMMET.

Witnesses:
FRANK M. CLARK,
C. ADAMS.